US 9,489,791 B2

(12) United States Patent
Chang

(10) Patent No.: US 9,489,791 B2
(45) Date of Patent: Nov. 8, 2016

(54) SANITIZED VENDING MACHINE HAVING CUP RETENTION-AND-RELEASE MECHANISM

(71) Applicant: Kil Jae Chang, Anyang (KR)

(72) Inventor: Kil Jae Chang, Anyang (KR)

( * ) Notice: Subject to any disclaimer, the term of this patent is extended or adjusted under 35 U.S.C. 154(b) by 104 days.

(21) Appl. No.: 14/121,782

(22) Filed: Oct. 16, 2014

(65) Prior Publication Data
US 2015/0041485 A1  Feb. 12, 2015

Related U.S. Application Data

(63) Continuation-in-part of application No. 13/507,808, filed on Jul. 30, 2012, now Pat. No. 9,038,853.

(60) Provisional application No. 61/997,024, filed on May 20, 2014.

(51) Int. Cl.
| | |
|---|---|
| *B65G 59/00* | (2006.01) |
| *B65H 1/00* | (2006.01) |
| *G07F 11/44* | (2006.01) |
| *B65G 59/06* | (2006.01) |
| *G07F 13/10* | (2006.01) |

(52) U.S. Cl.
CPC .............. *G07F 11/44* (2013.01); *B65G 59/061* (2013.01); *G07F 13/10* (2013.01)

(58) Field of Classification Search
CPC ........... G07F 11/62; G07F 3/10; G07F 11/44
USPC ...... 221/124, 192, 112, 113, 133, 92, 93, 95
See application file for complete search history.

(56) References Cited

U.S. PATENT DOCUMENTS

| | | | | |
|---|---|---|---|---|
| 1,952,447 | A * | 3/1934 | Madden ................ | G07F 13/065 141/107 |
| 3,618,642 | A * | 11/1971 | Beaulieu ................ | B65B 43/50 141/1 |
| 3,800,400 | A * | 4/1974 | Mistarz .................. | B65B 3/027 221/211 |
| 4,558,802 | A * | 12/1985 | Molison ............... | B65G 47/514 221/104 |
| 4,635,816 | A * | 1/1987 | Mikkelsen .............. | G07F 13/10 221/105 |

(Continued)

FOREIGN PATENT DOCUMENTS

| | | | | | |
|---|---|---|---|---|---|
| FR | | 2667421 | A1 * | 4/1992 | ............. G07F 13/10 |
| FR | EP | 0562198 | A1 * | 9/1993 | ............. G07F 13/10 |

(Continued)

*Primary Examiner* — Rakesh Kumar
(74) *Attorney, Agent, or Firm* — John R. Flanagan

(57) ABSTRACT

A sanitized vending machine includes product and cup dispensing mechanisms and an actuation mechanism. The product dispensing mechanism, holding product items, rotates through a product dispensing cycle to dispense them. The cup dispensing mechanism, holding a stack of cups, rotates through a cup dispensing cycle to dispense an empty cup to an intermediate location in a drop chute spaced above a final discharge location. Dispensing cycles occur in predetermined sequence enabling dispensed product items to be received in a previously dispensed cup. A cup retention-and-release mechanism disposed about and adjacent to the drop chute at the intermediate location converts between a cup hold position, wherein the empty cup is caught and retained at the intermediate location awaiting receipt of dispensed product items into the cup, and a cup release position, wherein the cup now having dispensed product items received therein is released and enabled to drop to the discharge location.

12 Claims, 8 Drawing Sheets

(56) References Cited

U.S. PATENT DOCUMENTS

| | | | | |
|---|---|---|---|---|
| 4,655,266 | A | * | 4/1987 | Ciekanski ............. A47J 31/401 141/104 |
| 4,989,753 | A | * | 2/1991 | Brogna ................... G07F 13/10 221/121 |
| 5,172,828 | A | * | 12/1992 | Ficken .................... G07F 13/10 221/105 |
| 5,400,838 | A | * | 3/1995 | Schjerven ........... A47J 37/1271 141/129 |
| 6,053,359 | A | * | 4/2000 | Goulet ..................... B67D 1/00 141/174 |
| 8,839,987 | B2 | * | 9/2014 | Doglioni Majer ...... G07F 13/10 141/168 |
| 9,038,853 | B2 | * | 5/2015 | Chang .................... G07F 11/44 221/133 |

FOREIGN PATENT DOCUMENTS

JP              2009163447 A  *  7/2009
KR         EP 1195096 A1  *  4/2002  ............... A23G 9/28

* cited by examiner

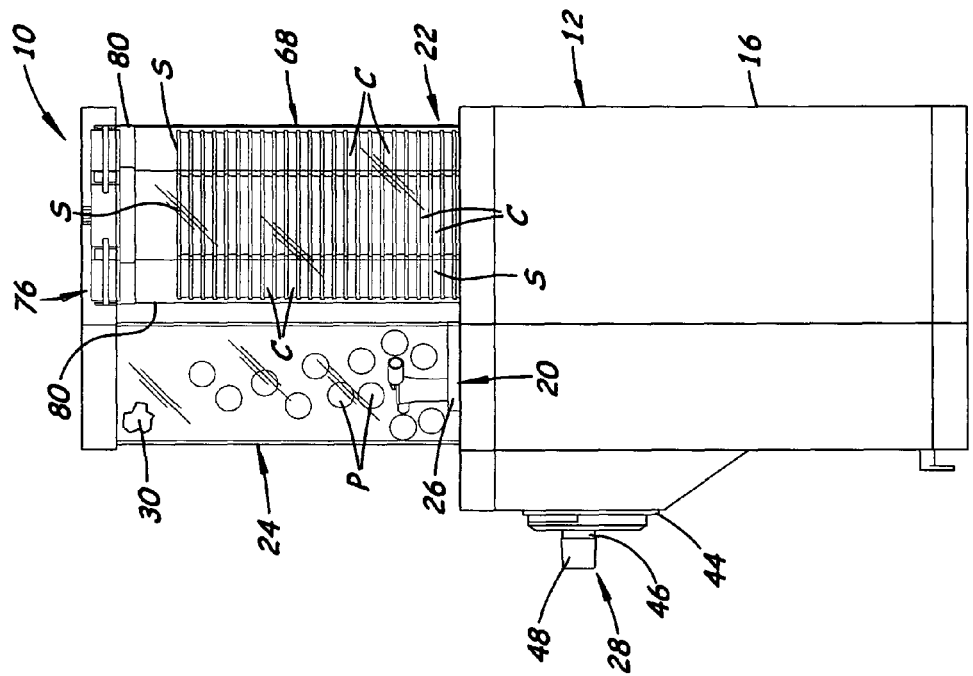
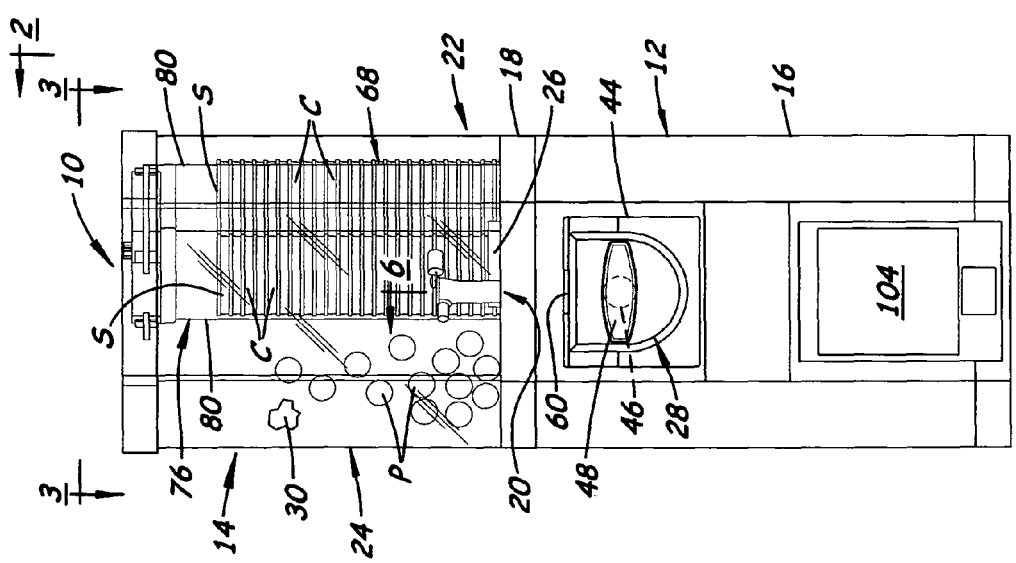

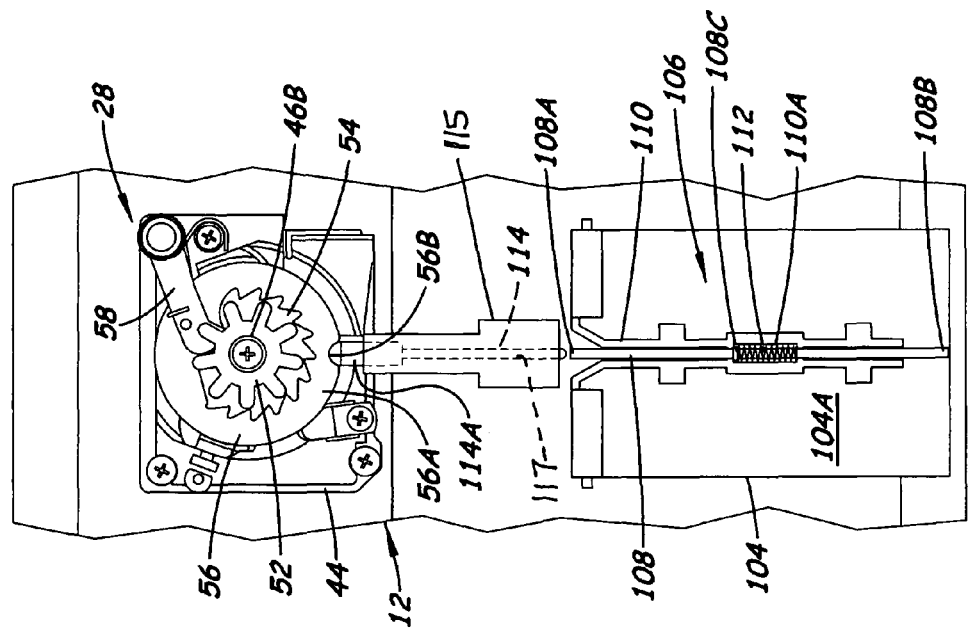
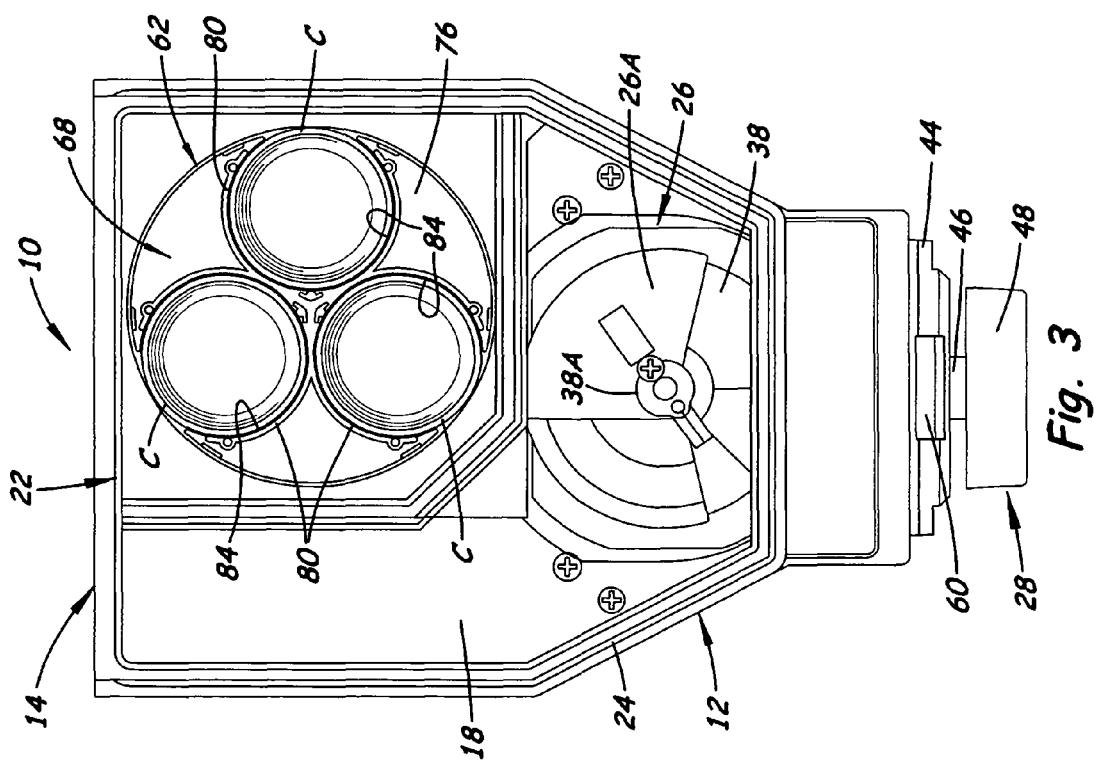

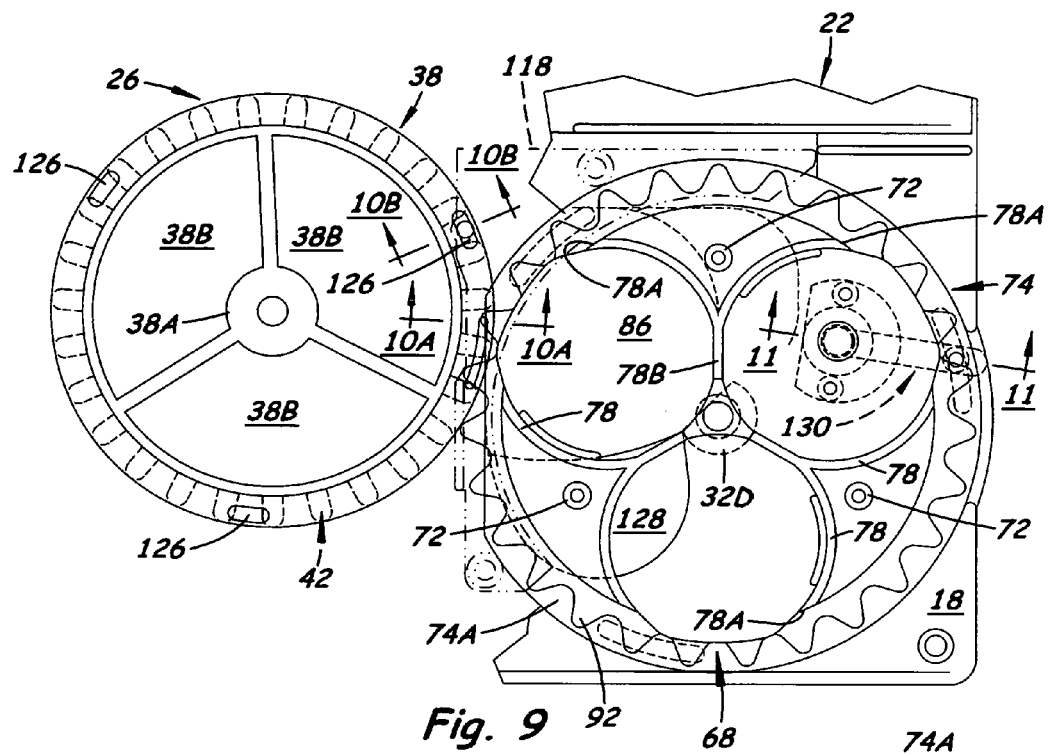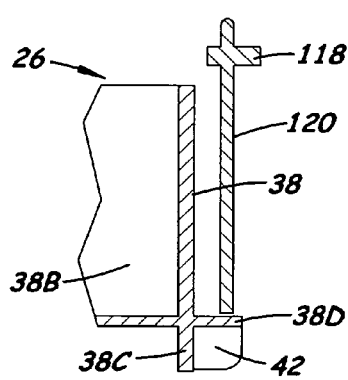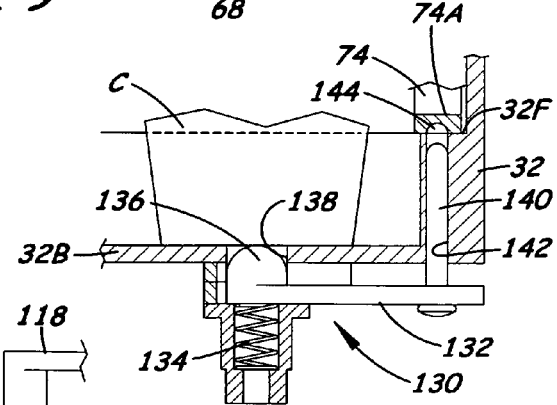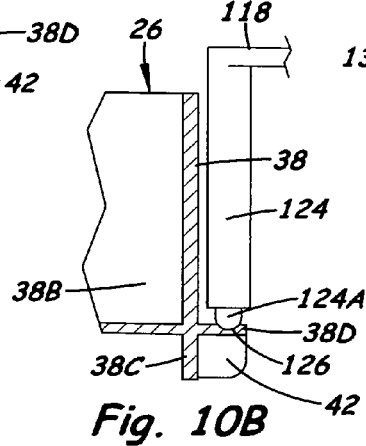

US 9,489,791 B2

SANITIZED VENDING MACHINE HAVING CUP RETENTION-AND-RELEASE MECHANISM

This patent application is a continuation-in-part of U.S. application Ser. No. 13/507,808, filed Jul. 30, 2012 now pending, which claims the benefit of U.S. provisional application No. 61/575,725 filed Aug. 26, 2011 and U.S. provisional application No. 61/631,747 filed Jan. 10, 2012. This patent application also claims the benefit of U.S. provisional application No. 61/997,024, filed May 20, 2014. Each application identified above is hereby incorporated by reference in its entirety to provide continuity of disclosure.

BACKGROUND OF THE INVENTION

1. Field of the Invention

The present invention generally relates to vending machines and, more particularly, is concerned with a sanitized vending machine having a cup retention-and-release mechanism associated with a drop chute adjacent to an intermediate location in the drop chute and above a final discharge location behind an access door.

2. Description of the Prior Art

Most prior art bulk coin-operated vending machines dispense their product items, such as candy or gum, into a non-removable cup fixed on, and ordinarily openable by manipulation of a pivotal flap mounted on the outside of, the housing of the machine which can be contacted and thus potentially contaminated by users' hands. The inventor of the subject matter disclosed herein has discerned that it is likely there are many potential users who would prefer alternative approaches for product items to be dispensed from bulk vending machines so that the dispensed product items cannot be contaminated through contact with parts of the vending machines which can be contacted and contaminated by users. An innovation which attempted to provide one alternative approach is disclosed in U.S. Pat. No. 7,066,351 by the inventor of the subject matter disclosed herein.

However, it is perceived by the inventor of the subject matter disclosed herein that a need still exists for other alternative approaches to sanitized dispensing from bulk coin-operated vending machines that incorporate appropriate mechanisms that assist in the fulfillment of such need.

SUMMARY OF THE INVENTION

The present invention relates to a sanitized vending machine that incorporates coordinating mechanisms that work to prevent all users from contaminating product items and parts of the machine that contact the product items, by only allowing the occurrence of certain actions within the machine and behind an external access door on the machine, and thus inaccessible to all users. These coordinating mechanisms generally result in, first, dispensing an empty cup from a stack thereof by dropping it via a drop chute such that the empty cup is retained at an intermediate location in the drop chute between upper and lower portions thereof, second, dispensing one or more selected product items from a supply thereof by dropping them via the drop chute into the dispensed empty cup while retained at the intermediate location, and, third, concurrently releasing and dropping the dispensed cup containing the product items from the drop chute to a discharge location behind the access door and allowing a user to open the access door in order to remove the dispensed cup containing the product items from the discharge location. The dispensed cup with the product items therein can only be removed from the discharge location in the machine upon the access door being enabled to be opened due to a given user operating the machine to make a purchase through depositing the required coins into the machine and turning an external handle on the machine through a given actuation cycle. An appropriate one of these coordinating mechanisms must have the capability of being able to reliably stop and retain each dispensed empty cup temporarily at the intermediate location in the drop chute before receipt of the dispensed product items into the cup and to not be adversely affected by occurrence of any occasional problems, such as variation in cup drop speed, or external impact forces by users or others on the machine, that might happen to occur during dispensing and dropping an empty cup to the intermediate location in the drop chute.

The present invention provides an improved mechanism in the sanitized vending machine in the form of a cup retention-and-release mechanism associated with the drop chute so as to reliably stop an empty cup dispensed and dropped to the intermediate location in the drop chute, retain the empty cup at the intermediate location until product items are dispensed and dropped into the cup causing the cup to release from temporary retention at the intermediate location and drop to a final discharge location behind the access door irrespective of the occurrence of any occasional aforementioned problems.

Accordingly, the present invention provides a sanitized vending machine which includes: a product dispensing mechanism adapted to hold a plurality of product items and rotate through a product dispensing cycle during which the product dispensing mechanism dispenses one or more of product items; a cup dispensing mechanism adapted to hold at least one stack of cups and rotate through a cup dispensing cycle during which the cup dispensing mechanism dispenses a cup from the stack; a drop chute disposed below and in communication with the product and cup dispensing mechanisms and being adapted to receive the dispensed product items and cup and guide the dispensed product items and cup to an intermediate location in the drop chute, being spaced below the product and dispensing mechanisms, and therefrom to a discharge location, being spaced below the drop chute and intermediate location therein; a cup retention-and-release mechanism disposed about and adjacent to the drop chute at the intermediate location thereof, the mechanism being adapted to convert between a cup hold position, wherein a dispensed cup is caught and retained at the intermediate location awaiting receipt of dispensed product items into the dispensed cup, and a cup release position in response to receipt of the dispensed product items in the dispensed cup, wherein the dispensed cup with the dispensed product items therein releases and drops to the discharge location; and an actuation mechanism including a rotatable actuator adapted to cause rotation of the product and cup dispensing mechanisms, and a handle coupled to the rotatable actuator and adapted to be turned by a user to rotate the rotatable actuator through an actuation cycle that causes rotation of the product and cup dispensing mechanisms through the respective product and cup dispensing cycles in a predetermined sequence so that the dispensed cup is guided to and received at the intermediate location of the drop chute at the completion of one actuation cycle and the dispensed product items are guided to and received in the dispensed cup being located at the intermediate location during the next actuation cycle thereby ensuring that only a cup with product items therein is dropped to the discharge location.

More particularly, the cup retention-and-release mechanism includes a plurality of pivotal ledges spaced apart from one another and being mounted to the drop chute about the intermediate location in the drop chute to undergo pivotal movement between inward extended positions defining the cup hold position and outward retracted positions defining the cup release position. The cup retention-and-release mechanism also includes a plurality of springs spaced apart from one another and being disposed so as to bias the pivotal ledges to assume the inward extended position in which the dispensed cup is caught and retained by the pivotal ledges at the intermediate location awaiting dispensing of product items therein, the bias of the springs being preselected such that the weight of the dispensed cup alone is insufficient to overcome the bias of the springs whereas the weight of the dispensed cup with the dispensed product items therein is sufficient to overcome the bias of the springs so as to thereby cause the pivotal ledges to pivot to the outward retracted position, allowing the dispensed cup and product items therein to drop to the discharge location. The cup retention-and-release mechanism further includes an arm movable between the cup hold position and the cup release position in response to rotation of the rotatable actuator of the actuation mechanism through each actuation cycle, the arm being in the cup hold position at termination of a current actuation cycle and until initiation of a next actuation cycle wherein the arm is aligned with a selected one of the pivotal ledges so as to ensure that the one pivotal ledge remains in the spring-biased extended position retaining the dispensed cup at the intermediate location, the arm being converted to the cup release position during the next actuation cycle wherein the arm is displaced from the selected one pivotal ledge so as to enable the one pivotal ledge and other pivotal ledges to move to the outward retracted position, allowing the dispensed cup and product items therein to drop to the discharge location.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a front elevational view of an exemplary embodiment of a sanitized vending machine in accordance with the present invention.

FIG. 2 is a side elevational view of the machine as seen along line 2-2 in FIG. 1.

FIG. 3 is a top plan view of the machine as seen along line 3-3 in FIG. 1.

FIG. 4 is an enlarged fragmentary elevational interior rear view of the front of the machine showing the backside of an actuation mechanism and an access door locking mechanism coordinated therewith.

FIG. 9 is an enlarged top plan view of a peripheral first driven gear on the product dispensing device drivingly intermeshed with a peripheral second driven gear on the cup dispensing mechanism of the machine as seen in FIG. 6.

FIG. 10A is a sectional view of a separation restraint device arm taken along line 10A-10A in FIG. 9.

FIG. 10B is a sectional view of a position restraint device rod taken along line 10B-10B in FIG. 9.

FIG. 11 is a sectional view of a cup stack depletion latching device employed in the machine taken along line 11-11 in FIG. 9.

DETAILED DESCRIPTION OF THE INVENTION

Figure 5:
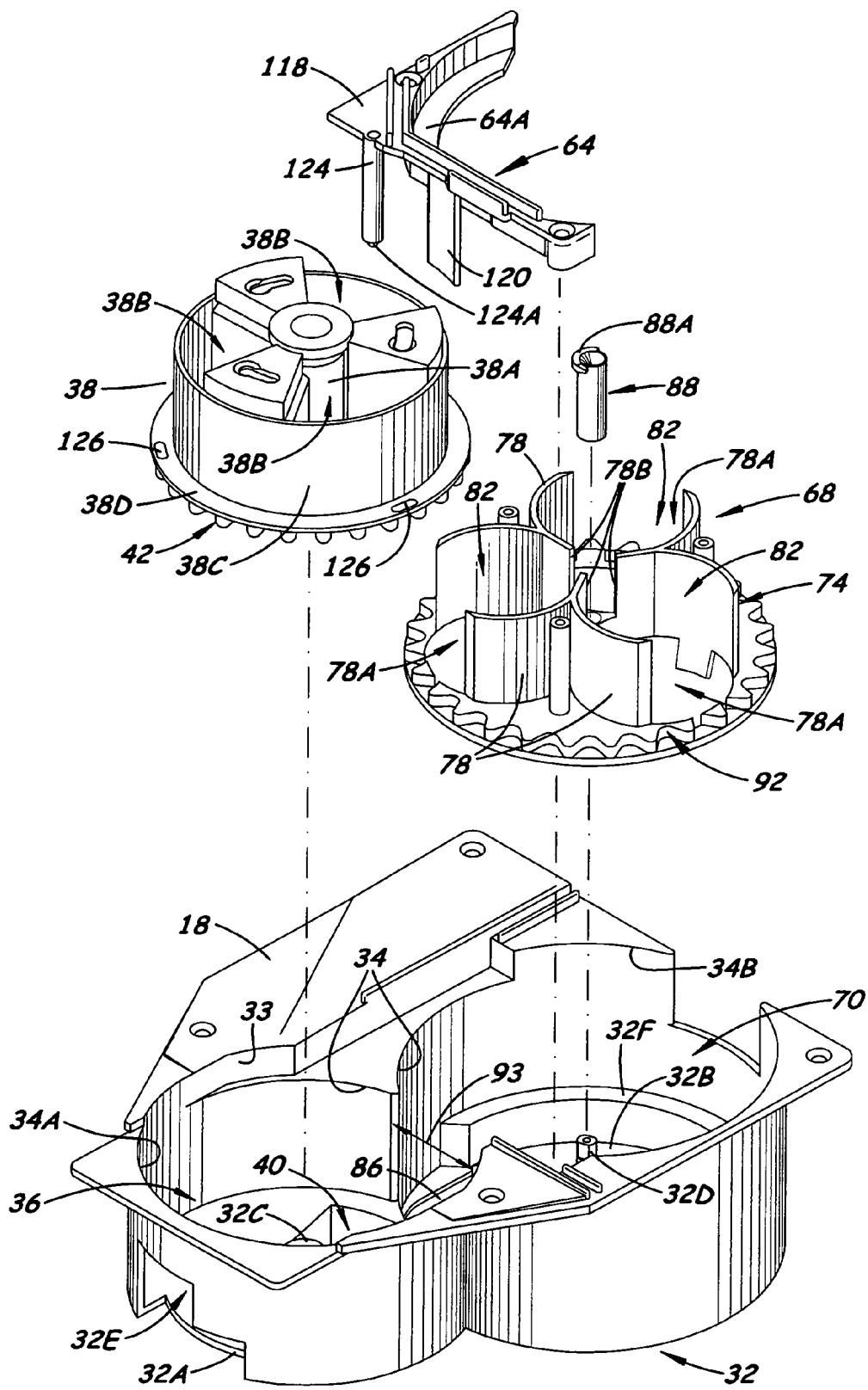
FIG. 5 is an exploded perspective view of a well structure, a product dispensing mechanism, a cup dispensing mechanism, and outer and inner cup separator devices employed in the machine as seen in FIG. 6.

Referring to the drawings, and particularly to FIGS. 1-3, there is illustrated an exemplary embodiment of a coin-operated sanitized vending machine, generally designated 10, in accordance with the present invention. The sanitized vending machine 10 basically includes a housing 12 and a vending unit 14. The housing 12 includes an upright base 16 and substantially horizontal top platform 18 peripherally supported above the upright base 16 upon an upper edge thereof. The vending unit 14 includes a product vending apparatus 20 and a cup dispenser apparatus 22 interfaced and supported in a substantially tandem arrangement with one another by the top platform 18 of the housing 12 such that the cup dispenser apparatus 22 is located behind the product vending apparatus 20.

Referring to FIGS. 1-3, 5 and 6, the product vending apparatus 20 of the vending unit 14 includes a merchandise storage magazine 24, a product dispensing mechanism 26, and a coin-operated actuation mechanism 28. The merchandise storage magazine 24 is supported upright by the top platform 18 above the housing 12 and defines a chamber 30 adapted for holding a plurality of product items P to be dispensed one or more at a time. The top platform 18 of the housing 12 has a well structure 32 affixed about and depending below an interior edge 33 of the platform 18 defining an opening 34 in the top platform 18.

The product dispensing mechanism 26 includes a product dispensing device 38 disposed through a front portion 34A of the opening 34 and within a front cavity 36 of the well structure 32 above a front bottom wall 32A thereof. The product dispensing device 38 is rotatably supported by a central tubular portion 38A thereof which fits over a pedestal 32C attached on and extending upwardly from the front bottom wall 32A. The product dispensing device 38 of the product dispensing mechanism 26 underlies the chamber 30 of the storage magazine 24 to receive the predetermined number of product items from the storage magazine 24 into each compartment 38B of the product dispensing device 38 radially extending outwardly from and circumferentially displaced about the central tubular portion 38A thereof. Upon rotation of the product dispensing device 38 through 120° of a 360° circular path of travel during each product dispensing cycle, the product items received in a given one of the compartments 38B are successively carried by the product dispensing device 38 under a stationary cover portion 26A of the product dispensing mechanism 26 and across an opening 40 in the front bottom wall 32A of the well structure 32 at which the product items then fall (in other words, are dispensed) through the opening 40 into a drop chute 66 located below and in communication with the product dispensing device 38 of the product dispensing mechanism 26.

The product dispensing device 38 also includes a first driven gear 42 defined about its lower periphery portion 38C. The well structure 32 has an opening 32E at a front end of the front cavity 36 facing the rear of the coin-operated actuation mechanism 28 of the product vending apparatus 20. Front portions of the product dispensing device 38 and the first driven gear 42 project through the front end opening 32E of the well structure 32 so that the first driven gear 42 can maintain an operative interfaced or driven relationship with the coin-operated actuation mechanism 28 as will be described hereinafter.

Referring to FIGS. 1-4 and 6, the coin-operated actuation mechanism 28 includes a mounting plate 44, a shaft 46, a handle 48, a coin carrier 50 and a drive gear 52. The mounting plate 44 mounts the coin-operated actuation mechanism 28 to the base 16 of the housing 12 by seating into an open top slot (not shown) defined in the housing base 16 below the upper edge thereof and forwardly of the product dispensing mechanism 26. The shaft 46 is rotatably mounted through and by the mounting plate 44 such that outer and inner end portions 46A, 46B of the shaft 46 extend to and are disposed at the exterior and interior of the housing base 16. The handle 48 is attached on the outer end portion 46A of the shaft 46 and thus disposed at the exterior of the housing 12 where the handle 48 may be gripped and turned by a user. The drive gear 52 is attached on the inner end portion 46B of the shaft 46 and thus disposed in the interior of the housing 12. The coin carrier 50 is attached along the shaft 46 and disposed in the interior of the housing between and spaced from the handle 48 and the drive gear 52. A user upon turning the handle 48 concurrently causes rotation of the shaft 46, coin carrier 50 and drive gear 52 within the housing 12. A one-way ratchet gear 54 is formed on a rear face of a wheel 56 attached along the shaft 46 in the interior of the housing 12 between the coin carrier 50 and drive gear 52. The ratchet gear 54 is engaged by a spring-loaded pawl 58 so that the shaft 46 can only be rotated in one direction, namely counterclockwise, as viewed in FIG. 4, upon turning the handle 48 clockwise, as viewed in FIG. 1. A peripheral edge portion 56A of the wheel 56 extends radially outward beyond the ratchet gear 54 and is provided with a recess or notch 56B at a six o'clock position about the wheel peripheral edge portion 56A. The purpose of the notch 56B will be explained hereinafter. The drive gear 52 and the wheel 56 may be considered together as a unit constituting a rotatable actuator that also will be explained hereinafter.

During a given actuation cycle, at least one coin is deposited by a user through a coin slot 60 along the top of the mounting plate 44. The coin is received by the coin carrier 50 which holds the coin as the handle 48 is turned by the user and the shaft 46, coin carrier 50 and drive gear 52 therewith are rotated through a 360° path of travel during the given actuation cycle. The rotation of the coin carrier 50 transfers the coin to and releases it at a coin storage location (not shown) in the housing base 16. The rotation of the drive gear 52, which underlies and drivingly meshes, interfaces or engages directly with the first driven gear 42 on the rotatable dispensing device 38, causes rotation of the first driven gear 42 and thus the product dispensing device 38 therewith. The ratio of the sizes of the respective gears 42, 52 is such that the first driven gear 42 and thus the product dispensing device 38 rotate through 120° each dispensing cycle in response to rotation of the shaft 46 and drive gear 52 by the turning of the handle 48 through the entire 360° circular path of travel during the given actuation cycle. Thus, the dispensing of one or more product items occurs from a successive one of the compartments 38B of the product dispensing device 38 through the product dispensing opening 40 in the front bottom wall 34A of the well structure 34 during each actuation cycle of the coin-operated actuation mechanism 28 of the product vending apparatus 20 of the vending unit 14.

Referring to FIGS. 3 and 5-8, the cup dispenser apparatus 22 of the vending unit 14 includes a cup dispensing mechanism 62 and outer and inner cup separator devices 64, 88. The vending unit 14 also includes a drop chute 66 disposed below and in communication with the product and cup dispensing mechanisms 26, 62. The cup dispensing mechanism 62 includes a cup magazine or holder device 68 disposed within a rear cavity 70 of the well structure 32 and being rotatably supported on a central pedestal 32D affixed upright on a rear bottom wall 32B of the well structure 32 (which rear bottom wall 32B is at a level lower than the level of the front bottom wall 32A). The cup holder device 68 includes a lower holder part 74 that is rotatably fitted over and supported by the central pedestal 32D and also by an interior ledge 32F of the well structure 32 such that the lower holder part 74 is disposed in a spaced relationship above the rear bottom wall 32B of the well structure 32. The cup holder device 68 also includes an upper holder part 76 (FIGS. 1 and 2) that seats and is fastened upon internally-threaded posts 72 (FIGS. 5 and 9) affixed on and extending upright from the lower holder part 74. The upper holder part 76 is thereby carried by the lower holder part 74 along a 360° circular path of rotational travel. The upper holder part 76 extends upwardly through a rear portion 34B of the opening 34 in the top platform 18 to above the top platform 18 of the housing 12, as seen in FIGS. 1 and 2.

The cup holder device 68 also includes multiple lower tubular columns 78 in the lower holder part 74 and multiple upper tubular columns 80 in the upper holder part 76 (FIGS. 1 and 2). The multiple lower and upper tubular columns 78, 80, such as three in number, are vertically aligned with one another. The vertically aligned lower and upper tubular columns 78, 80 also are disposed side-by-side and angularly displaced 120° from one another. The lower and upper tubular columns 78, 80 in the lower and upper holder parts 74, 76 of the cup holder device 68 are open at their opposite ends so as to define passageways 82, 84 through the tubular columns 78, 80 that allow insertion of stacks of cups C through the upper open ends of the upper holder part 76 and also communicate at the lower open ends of the lower holder part 74 with the drop chute 66 of the apparatus 22 when successively aligned with a cup dispensing opening 86 in the rear bottom wall 32B of the well structure 32 located below a portion of the cup holder device 68. The lower tubular columns 78 also have vertical outer and inner slots 78A, 78B formed therein which extend between their opposite ends along their outer and inner sides. The inner slots 78B extend from their upper ends and terminate a short distance above their lower ends. The vertical inner slots 78B provide space for insertion and support of the inner cup separator device 88 upon the central pedestal 32D by use of a fastener 90 which extends through a central bore in the lower holder part 74 and threads into the central pedestal 32D. The inner cup separator device 88 cooperates with the outer cup separator device 64, as will be further described hereinafter, to control separation of each lowermost cup LC from its stack as the cup holder device 68 rotatably moves through 120° of the 360° circular path of travel.

The cup dispensing mechanism 62 also includes a second driven gear 92 defined about the lower periphery of the lower holder part 74 of the cup holder device 68 on the top side of a peripheral flange 74A on the lower holder part 74 that overlies an interior ledge 32F in the rear cavity 70 of the well structure 32. The well structure 32 has an opening 93 at the intersection between its front and rear cavities 36, 70 such that as the product dispensing device first driven gear 42 rotates through the 360° circular path of travel, a rear portion thereof and a front portion of the cup dispensing mechanism gear 92 project through the opening 93 between the cavities 36, 70 of the well structure 32 and directly drivingly intermesh, engage or interface with one another. Such intermeshing will cause rotation of the cup holder device 68 through 120° of the 360° circular path of travel, and thus operation of the cup dispenser apparatus 22 through a cup dispensing cycle, upon rotation of the shaft 46 and drive gear 52 thereon by the turning of the handle 48 of the coin-operated actuation mechanism 28 through the 360° circular path of travel of a given actuation cycle to thereby cause the dispensing of the product items from one of the compartments 38B of the dispensing device 38 through the product dispensing opening 40 in the front bottom wall 32A of the well structure 32, and dispensing of a cup from one of the lower tubular columns 78 of the lower holder part 74 of the cup holder device 68 through the cup dispensing opening 86 in the rear bottom wall 32B of the well structure 32, in a manner into and through a drop chute 66 such that a cup C with product P therein will be delivered to an accessible location of the vending unit 14, as will be described hereinafter.

Referring to FIGS. 5-8, the outer cup separator device 64 of the cup dispenser apparatus 22 is incorporated on a bracket 118 described hereinafter. The bracket 118 incorporating the outer cup separator device 64 has an arcuate configuration so as to extend through about a 150° portion of the 360° circular path of travel of the cup holder device 68 such that the bracket 118 overlies as well as is disposed both upstream and downstream of the cup dispensing opening 86 whereas the outer cup separator device 64 overlies and extends a short distance inwardly beyond the outer side of the cup dispensing opening 86 beginning at the upstream end thereof.

The outer cup separator device 64 and the top of the inner cup separator device 88 are disposed in a spaced relationship above the rear bottom wall 32B of the well structure 32 at a height slightly greater than the height of one cup C and in a stationary relationship to the rotatable cup holder device 68. The top level of the outer cup separator device 64 lies in a horizontal plane just below the bottom level of the upper holder part 76 and aligned with the upper level of the lower holder part 74. The outer cup separator device 64 at its inner edge portion 64A extends tangentially to and slightly inwardly across through the outer slots 78A as their respective lower tubular columns 78 rotate past the outer cup separator device 64. The portion of the outer cup separator device 64 that overlies the cup dispensing opening 86 has an arcuate-shaped cam segment 94 defined therealong with a wedge-shaped or tapered entry end 94A that will ensure separation of the lowermost cup C from the next cup C above it in the stack S. To prevent the remaining stack of cups above the lowermost cup LC from also falling downward through the cup dispensing opening 86, the top of the inner cup separator device 88 has a radially outward protruding circular rim portion 88A extending through about 180° opposite from and co-extensive with the inner edge portion 64A of the outer cup separator device 64, The top rim R of the next higher cup C above the lowermost cup C of the two stacks approaching and leaving the location of the cup dispensing opening 86 overlies the inner edge portion 64A of the outer cup separator device 64 and the opposing rim portion 88A of the inner cup separator device 88 so as to support the remaining stack of cups thereon. The rim portion 88A of the inner cup separator device 88 is cut away for about the remaining 180° thereabout so as to withdraw support from the remaining stack of cups during travel through that portion of its circular path opposite from the location of the outer cup separator device 64, allowing the new lowermost cup and remaining stack to drop down onto the rear bottom wall 32B of the well structure 32 such that the top rim R of the new lowermost cup will be just below and thus pass under the inner edge portion 64A of the outer cup separator device 64 as well as below the protruding rim portion 88A of the inner cup separator device 88 in preparation for engaging with the wedge-shaped or tapered entry end 94A of the depending cam segment 94 of the outer cup separator device 64.

The dispensed empty cup drops downward through the funnel-shaped upper portion 66A of the drop chute 66 and into a substantially vertical lower portion 66B thereof until the top rim R of the cup C encounters and is caught by a cup retention-and-release mechanism 300 which includes a plurality of circumferentially-spaced apart pivotal protrusions or ledges 96 inwardly biased by springs 98 and mounted on pins 100 in recesses 102 at an intermediate location near where the upper portion 66B of the drop chute 66 merges into the lower portion 66B thereof. The cup C is stopped by the inwardly extended pivotal ledges 96, due to the bias of the springs 98, and temporarily held seated on the ledges 96 at the intermediate location about midway down the cup pathway until the product items guided by the drop chute 66 have dropped into the cup. The bias of the springs 98 is preselected such that the weight of the product and the cup is sufficient to overcome the bias of the springs 98 and cause the pivotal ledges 96 to pivot outwardly away from the cup C, allowing the cup C with product items therein to drop to the final location on the base 16 of the housing 12 behind an external access door 104 pivotally mounted on the front of the vending machine 10 where the cup C (FIG. 6) can be removed by the user opening the access door 104. (The pivotal ledges 96, bias springs 98 and pivot point pins 100 constitute basic components of the cup retention-and-release mechanism 300; additional components described in greater detail hereinafter provided improved operation of the cup retention-and-release mechanism 300.)

Figure 6:
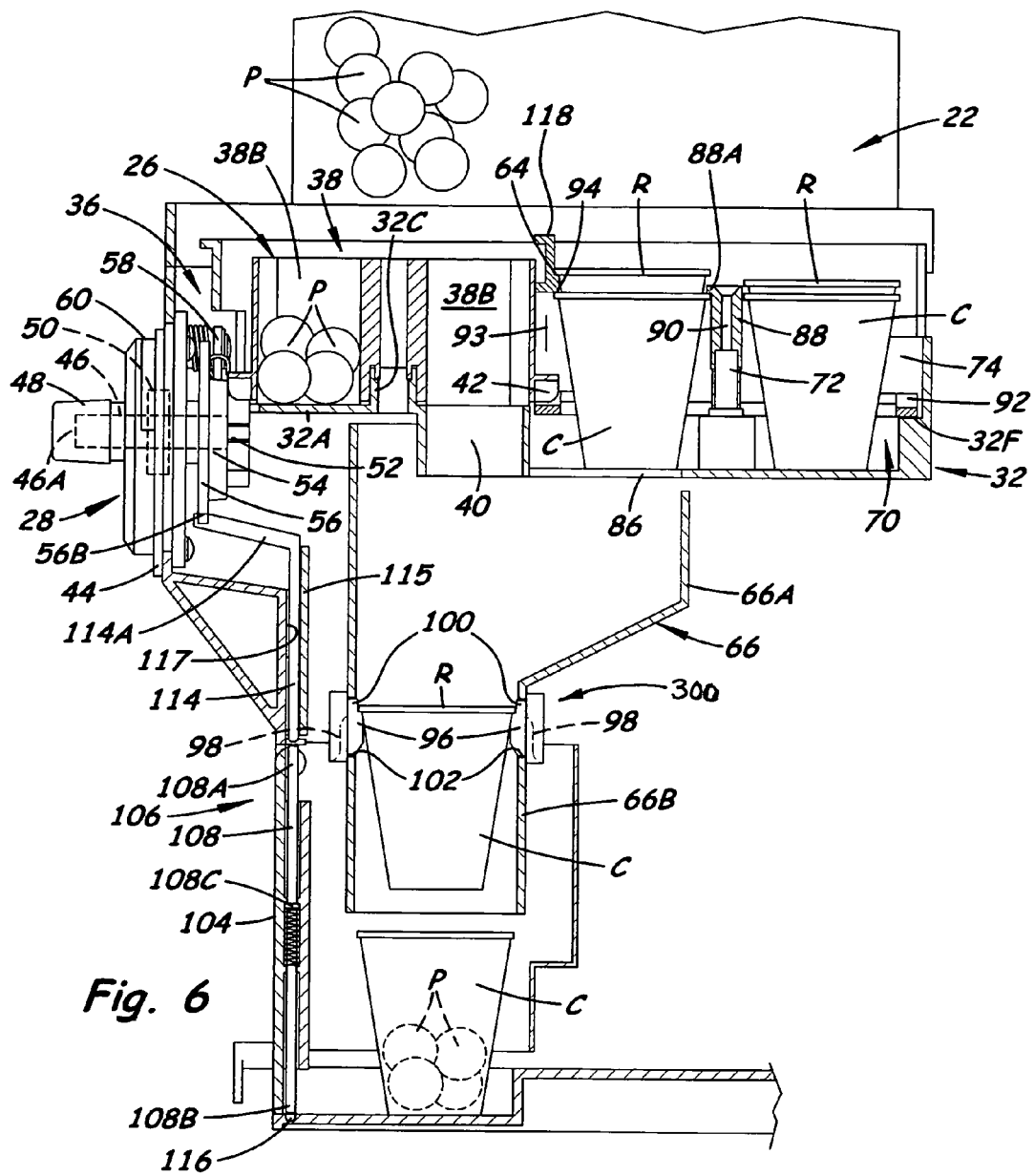
FIG. 6 is an enlarged vertically foreshortened view of the machine, with portions in sectional form, as seen generally along line 6-6 in FIG. 1, showing an exemplary embodiment of a cup retention-and-release mechanism made up of components disposed at an intermediate location in a drop chute.
Figures 7, 8:
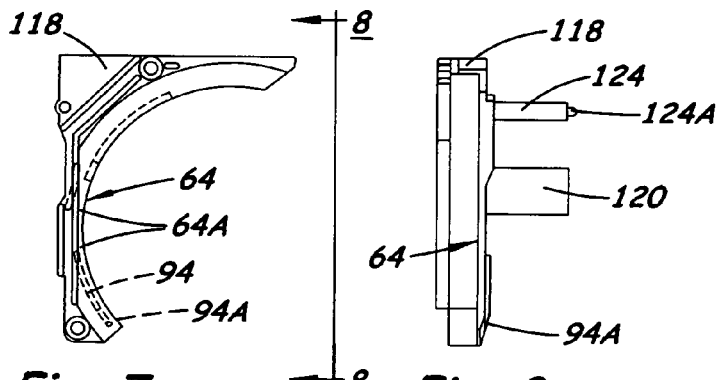
FIG. 7 is an enlarged top plan view of the outer cup separator device of FIGS. 5 and 6.
FIG. 8 is a side elevational view of the outer cup separator device as seen along line 8-8 in FIG. 7.

Referring to FIGS. 4 and 6, the vending unit 14 includes an access door locking mechanism 106 to control access of a user to the location in the base 16 behind the access door 104. The mechanism 106 maintains the access door 104 in a locked condition and thus disabled from providing access by a user until the handle 48 of the coin-operated actuation mechanism 28 is turned through the full 360° circular path of travel of a given actuation cycle such that upon reaching the end of the cycle the access door 104 is converted to an unlocked condition and may be opened by a user who then may reach in and remove the cup with the product items. The access door locking mechanism 106 includes an elongated rod 108 reciprocally mounted through a retainer member 110 secured on the inside surface 104A of the access door 104 and encircled by a spring 112 at a location intermediate the opposite upper and lower ends 108A, 108B of the rod 108. The spring 112 is disposed in a slot 110A in the retainer member 110 in a compressed condition between a collar 108C on the rod 108 and an end of the slot 110A so as to bias the rod 108 upwardly to place the access door 104 in an unlocked condition.

The access door locking mechanism 106 also includes an arm-shaped lock actuation device 114 mounted in the base 16 of the housing 12 above and aligned with the rod 108 so as to undergo vertical reciprocal movement during a given actuation cycle in a channel 117 defined by a stationary bracket 115 (see FIG. 15) fixed on the housing 12. An upper arm portion 114A of the lock actuation device 114 underlies the peripheral edge portion 56A of the rotatable actuator wheel 56 of the coin-operated actuation mechanism 18 such that the peripheral edge portion 56A engages the upper arm portion 114A and depresses the lock actuation device 114 and then the rod 108 downward against the bias of the spring 112 such that the lower end 108B is inserted into a hole 116 in the base 16 of the housing 12 below the access door 104, locking the door against being pivoted away from the housing 12. When the handle 48 of the mechanism 28 has been turned to the end of a complete 360° circular path of travel of a given actuation cycle, the upper arm portion 114A of the lock actuation device 114 becomes aligned with the notch 56B in the peripheral edge portion 56A of the wheel 56, allowing the upper arm portion 114A of the lock actuation device 114 and the rod 108 to move upward due to the bias force of the spring 112 and retract the lower end 108B from the hole 116 in the base 16 of the housing 12. The access door 104 can then be opened and the cup with product therein removed. This arrangement will ensure that the cup cannot be removed prematurely.

The flow of driving torque begins when, after a user deposits the appropriate number of coins into coin slot 60, the user turns the handle 48 of the mechanism 28 clockwise, as viewed in FIG. 1. Turning of the handle 48 rotates the shaft 46 and also rotates the drive gear 52 and wheel 56 (constituting the components of the rotatable actuator) with the shaft 46, the rotation of the latter is counterclockwise as viewed in FIG. 4 which is in a direction opposite to that in FIG. 1. Rotation of the rotatable actuator drive gear 52 rotates the product vending apparatus first driven gear 42 and the product dispensing device 38 therewith which, in turn, rotates the cup dispenser apparatus second driven gear 92 and the cup holder device 68 therewith. The arrangements of the product dispensing device 38 and cup holder device 68 relative to their respective dispensing openings 40, 86 are such that each compartment 38B of the product dispensing device 38 travels over the product dispensing opening 40 before each passageway 82 through the lower holder part 74 of the cup holder device 68 travels over the cup dispensing opening 86; thus, the product items are dropped from the respective compartment 38B into the drop chute 66 before the cup is dropped from the respective passageway into the drop chute 66 during the same actuation cycle. However, the vending unit 14 is set up such that the empty cup dispensed at the completion of the previous actuation cycle is captured and retained by the pivotal protrusions or ledges 96 at the intermediate position in the drop chute 66 and thus will receive product items during the succeeding actuation cycle. When the product items drop into the cup their weight added to the cup's weight is sufficient to force outward retraction of the ledges 96, against the opposed biasing force applied by the springs 98, thereby releasing the cup (with the product therein) from the ledges 96 and allowing it to drop to the discharge location behind the access door 104. The next cup then dispensed, subsequent to the product items, at the completion of the same actuation cycle will be caught and retained by the ledges 96, which will have immediately extended back toward one another due to the biasing force applied on the ledges 96 by the springs 98, for receiving product during the subsequent actuation cycle.

Referring now to FIGS. 5 and 9-14, there is illustrated five features for further enhancing the operation of the sanitized vending machine 10. Referring first to FIGS. 5, 9 and 10A, there is shown a bracket 118 mounted upon recessed shelves along the front and a side of the rear cavity 70 of the well structure 32 in overlying relation to the opening 93 at the intersection of the front and rear cavities 36, 70. Thus, the bracket 118 is spaced above the location of intermeshing of the gear 42 about the lower periphery of the dispensing device 38 with the second driven gear 92 on the lower periphery of the lower holder part 74 of the cup holder device 68. In addition to the above-described cup separator device 64, the bracket 118 incorporates a first of the five operation-enhancing features which is a separation restraint device in the form of an arm 120 attached to and depending from the bracket 118. As best seen in FIG. 10A, the arm 120 terminates just above and in a close positional relationship to an upper side of a flange 38D on the lower periphery portion 38C of the dispensing device 38. On the underside of the flange 38D is formed the first driven gear 42. The function of the depending arm 120 is to ensure that the first and second driven gears 42, 92 cannot separate from their interfacing relationship with one another and thus, in other words, to maintain the driving interfacing or intermeshing engagement of the first and second driven gears 42, 92 with one another.

Referring now to FIGS. 5, 9 and 10B, there is shown a second of the five operation-enhancing features which is a position restraint device in the form of a rod 124 having a spring-biased retractable tip 124A. The rod 124 is attached to and depends from the bracket 118 in a spaced relationship from the restraint arm 120 and generally parallel thereto. As best seen in FIG. 10B, the retractable tip 124A is spring biased to protrude downwardly into one of three depressions 126 formed at 120 degree intervals in the top of the flange 38D, marking the end of each product dispensing cycle so as to ensure that the dispensing device 38 is maintained in proper beginning alignment for the start of the next product dispensing cycle. The tip 124A is adapted to retract and permit rotation of the product dispensing device 38 in response to a subsequent actuation cycle.

Referring again to FIG. 9, there is also illustrated a third of the five operation-enhancing features which is in the form of a depression 128 formed in the rear bottom wall 32B of the well structure 32 at the upstream side of the cup dispensing opening 86 therein. The depression 128 ensures that the lowermost cup will release on time from the cup immediately above it as the one stack of cups is moved over the cup dispensing opening 86.

Referring now to FIGS. 9 and 11, there is shown a fourth of the five operation-enhancing features in the form of a latching device 130 mounted to exterior of the rear bottom wall 32B of the well structure 32 downstream from the cup dispensing opening 86. The latching device 130 has a link 132 biased by a spring 134 to move upwardly toward the rear bottom wall 32B. The link 132 at an inner end has attached thereto a first pin 136 which extends through a hole 138 in the rear bottom wall 32B in the path of the stack of cups as they are moved in a circular path upon the wall 32B. The link 132 at an outer end has attached thereto a second pin 140 which extends through a slot 142 formed vertically through the interior ledge 32F on the wall 32B and underlying a peripheral flange 74A of the lower holder part 74 of the cup holder device 68. The second pin 140 is aligned to insert into any one of multiple (three) recesses 144 formed on the underside of the peripheral flange 74A of the lower holder part 74 of the cup holder device 68. The latching device 130 functions to detect depletion of any one of the stacks of cups and in response thereto to stop the ability of the cup holder device 68 to rotate and thereby prevent a user from being able to turn the handle 48 of the coin-operated actuation mechanism 28. The weight of a single last cup of the stack thereof will be enough to depress the first pin 136 and the link 132 and thereby retract the second pin 140 away from above the wall 32B and the recesses 144. However, when the last cup has been used, then the spring 134 causes the first and second pins 136, 140 and the link 132 to elevate and the second pin 140 to protrude into a corresponding one of the recesses 144 and thereby lock the cup holder device 68 in a fixed state.

Figure 12:
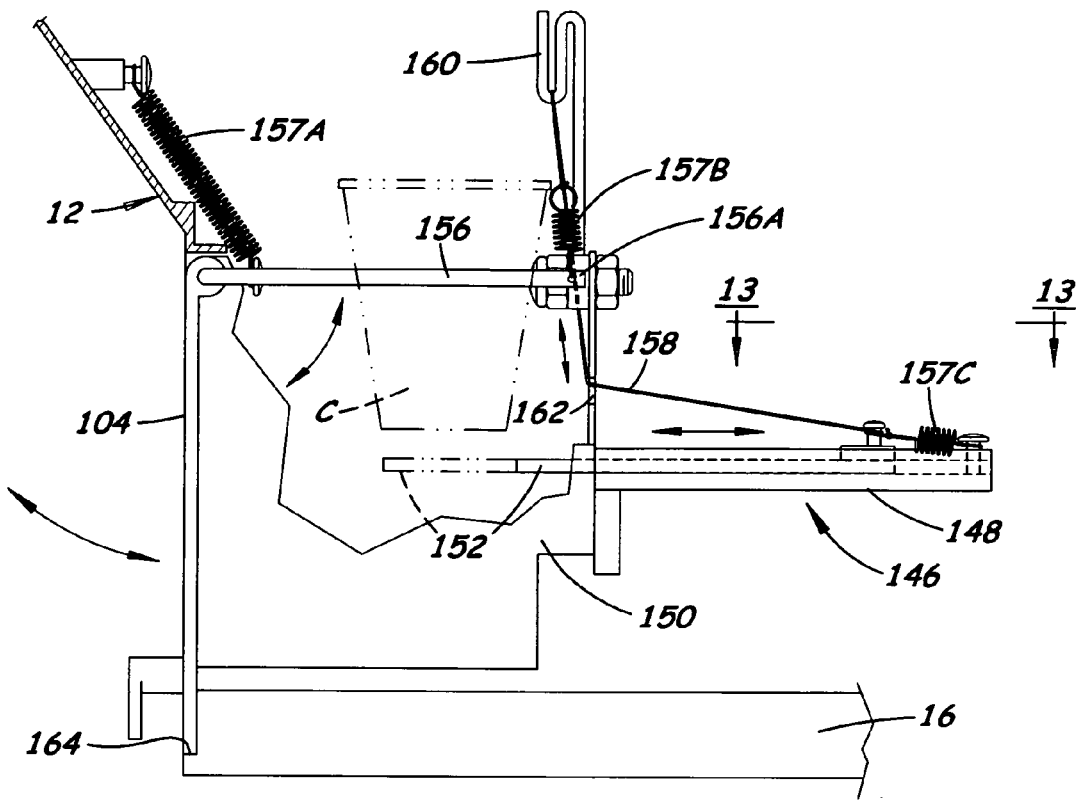
FIG. 12 is a fragmentary side elevational view of the machine with portions broken away to illustrate a cup shielding mechanism employed in the machine.
Figure 13:
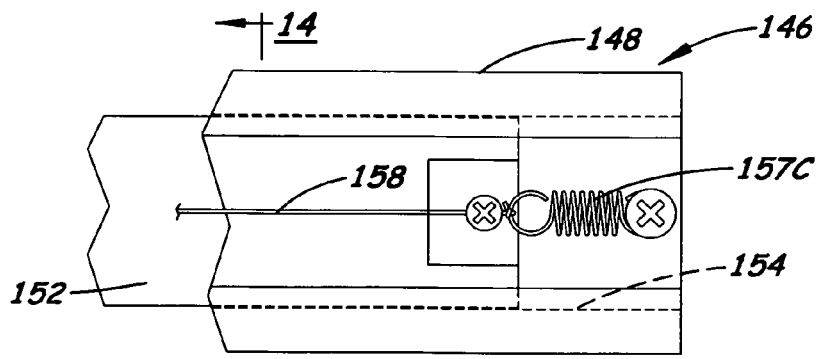
FIG. 13 is a fragmentary top plan view of the cup shielding mechanism as seen along line 13-13 in FIG. 12.
Figure 14:
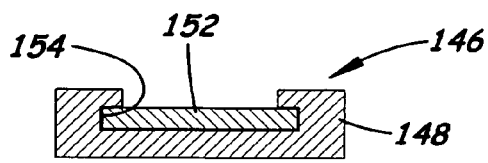
FIG. 14 is a cross-sectional view of the cup shielding mechanism taken along line 14-14 in FIG. 13.

Referring to FIGS. 12-14, there is illustrated a last of the five operation-enhancing features in the form of a cup shielding mechanism 146 which extends and obstructs access, when the unlocked access door 104 is opened by a user, to the next cup that is in position to receive product on the next dispensing cycle. The shield mechanism 146 includes a bed 148 mounted to extend from a bracket 150 upstanding from the base 16 of the housing 12, a track 154 formed on the topside of the bed 148 and a plank 152 slidably mounted in the track 154. The shield mechanism 146 also includes an arm 156 that is fixed to and extends outwardly from the door 104 such that the arm 156 moves with the door 104. The shield mechanism 146 further includes a first spring 157A anchored to the housing 12 and connected to the arm 156 so as to apply a bias force to the arm 156 tending to pivot the door 104 to a closed position as seen in FIG. 12. The shield mechanism 146 still further includes a second spring 157B and cable 158 connected to a rear end 156A of the arm 156 and extending therefrom upwardly and over an elevated hook 160, then downwardly to and through a hole 162 in the bracket 150, then rearwardly to where it is connected the rear end of the plank 152 (or, alternatively only an angular arrangement of springs between the rear end 156A of the arm 156 and rear end of the plank 152 in place the second spring 157B, cable 158, elevated hook 160 and hole 162 in bracket 150), and a third spring 157C connected between a rear end of the bed 148 and the rear end of the plank 152. This arrangement will cause the plank 152 to slide forwardly to a position underlying the cup when the door 104 is pivoted open and then automatically retract when the door 104 is pivoted closed. This will prevent a user reaching through the opening 164 in the housing 12 when the door 104 is open from being able to contact the next cup being held at the intermediate location and thereby attempt to disrupt the steps involved in filling the next cup with product and dropping it to onto the dispensing location.

Figure 15:
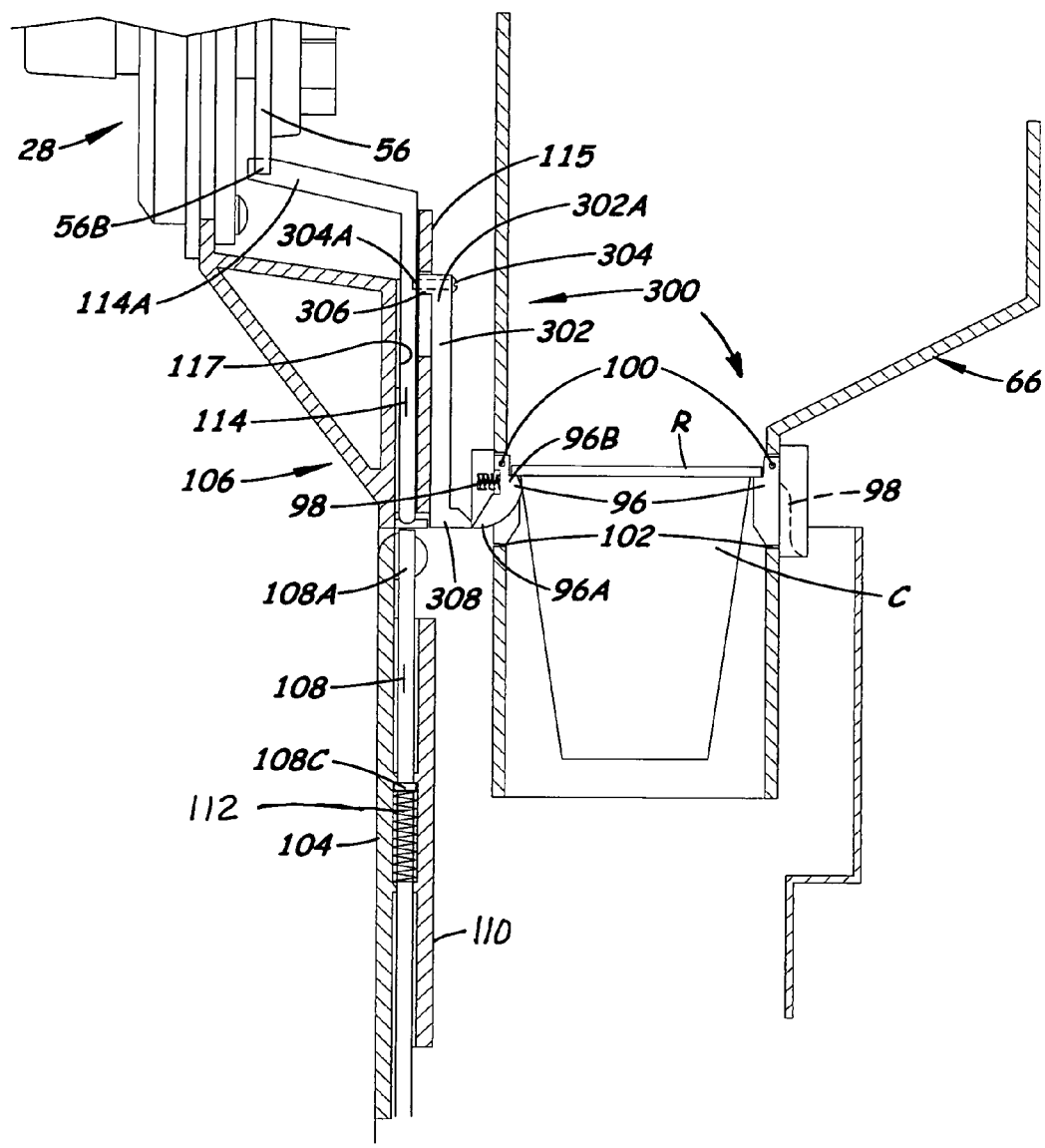
FIG. 15 is a fragmentary sectional view of an exemplary embodiment of the cup retention-and-release mechanism having additional components associated and coordinated with the access door locking mechanism, being also seen in FIG. 4, and the drop chute, being also seen in FIG. 6.
Figure 16:
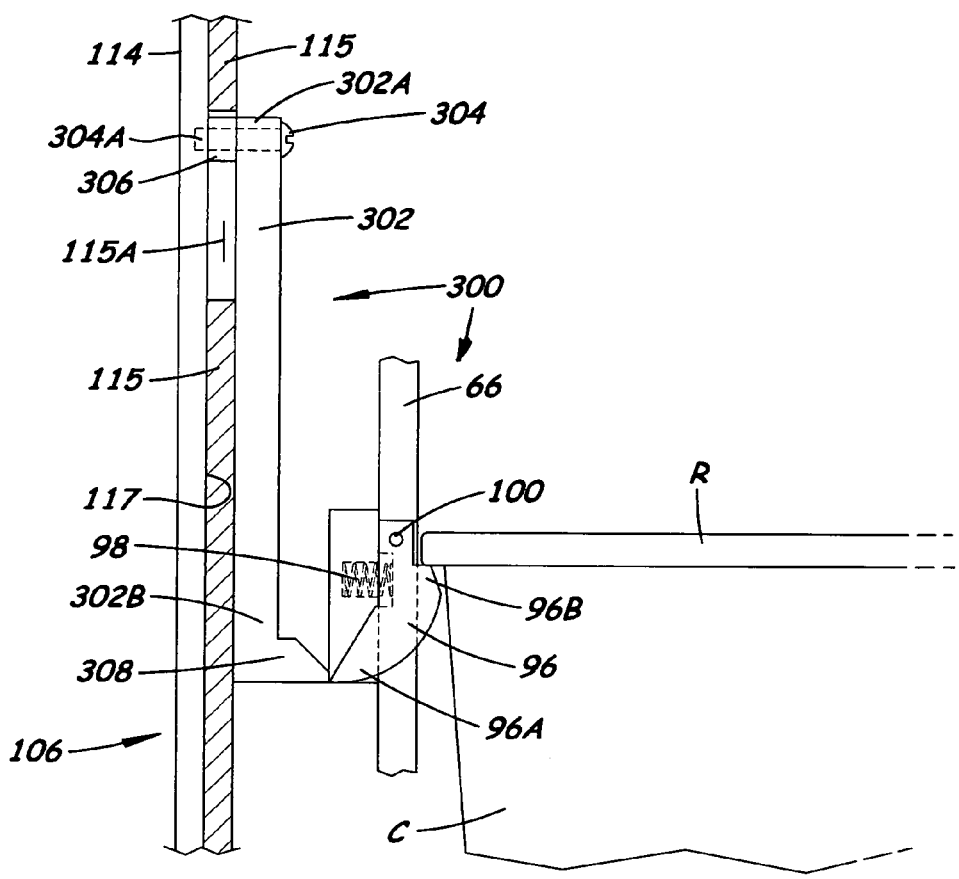
FIGS. 16 and 17 are enlarged fragmentary sectional views of the cup retention-and-release mechanism of FIG. 15 respectively shown in a hold cup position in FIG. 16 and a release cup position in FIG. 17.
Figure 17:
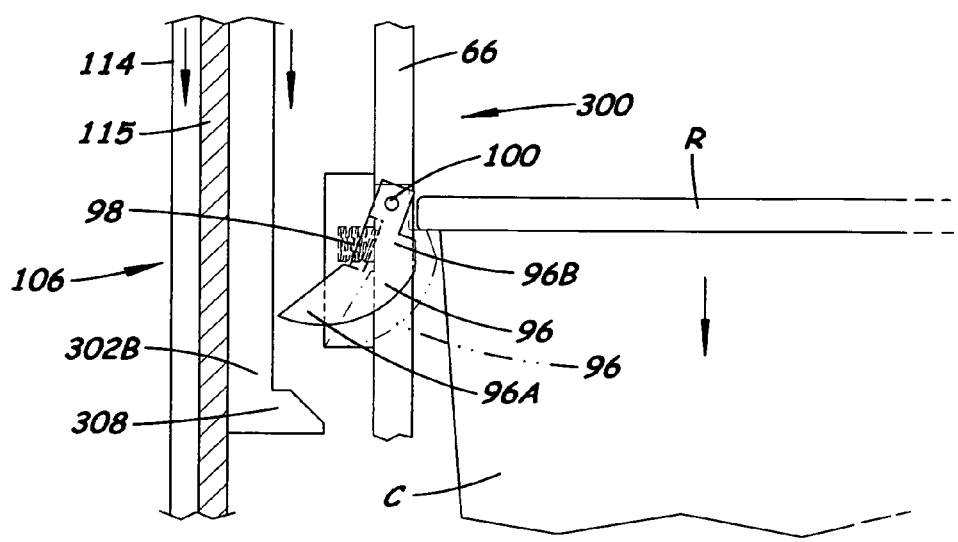

Referring to FIGS. 15-17, there is illustrated an exemplary embodiment of the cup retention-and-release mechanism, generally designated 300, provided in the sanitized vending machine 10 of the present invention, with additional components being shown that are associated and coordinated with the access door locking mechanism 106, being also seen in FIG. 4, and the drop chute 66, being also seen in FIG. 6, that improve operation of the cup retention-and-release mechanism 300. The implementation of the additional components of the cup retention-and-release mechanism 300, in association with the drop chute 66 and coordinated with operation of the access door locking mechanism 106, will positively ensure that the dispensed empty cup will be reliably stopped or caught at the intermediate location in the drop chute 66 and retained at the intermediate location until product items are dispensed and dropped into the cup, causing the cup to release from temporary retention at the intermediate location in the drop chute 66 and drop to the final discharge location located behind the access door 104, irrespective of the occurrence of any of the aforementioned occasional problems. The additional components of the cup retention-and-release mechanism 300 are located between and adjacent to the drop chute 66 and the access door locking mechanism 106 and aligned with the one of the pivotal protrusions or ledges 96 nearest thereto. When the access door locking mechanism 106 is utilized in the sanitized vending machine 10, the additional components constituting improvements to the mechanism 300 are coordinated with operation thereof so as to reliably stop a dispensed empty cup C at the intermediate location at the completion of the current actuation cycle when the access door locking mechanism 106 converts the access door 104 from the locked to unlocked condition. The access door 104 is converted to the unlocked condition to allow access by a user to a dispensed cup with dispensed product therein resting at the discharge location at the completion of the current actuation cycle by the user. Concurrently therewith, an empty cup is dispensed and dropped to the intermediate location in preparation for receiving product during initiation of the next actuation cycle by a user.

More particularly, the additional components of the cup retention-and-release mechanism 300 include an auxiliary arm 302 which at an upper end 302A is fixedly attached by a fastener 304 at its inner end 304A to the arm-shaped lock actuation device 114 of the access door locking mechanism 106 at an upper location thereon below an upper arm portion 114A of the device 114 such that auxiliary arm 302 moves along with movement of the lock actuation device 114. (In a case where the access door locking mechanism 106 might not be utilized in the sanitized vending machine 10, the arm-shaped device 114 would still be employed in conjunction with the auxiliary arm 302.) Also, one of the actuation device 114 or the upper end 302A of the auxiliary arm 302 has a spacer 306 thereon which extends through a slot 115A in the bracket 115 so as to offset the auxiliary arm 302 in its fastened relationship to the actuation device 114 such that the auxiliary arm 302 extends in a depending orientation from the spacer 306 downward along the outside of the bracket 115. The auxiliary arm 302 has a cam lug 308 formed on a lower end 302B of the arm 302 which extends in a transverse relationship away from the arm 302.

FIGS. 15 and 16 shows the cup retention-and-release mechanism 300 in a cup hold position wherein the lock actuation device 114 of the access door locking mechanism 106 and thus the access door 104 are disposed in an unlocked condition, as occurs at the completion of a given actuation cycle and lasts until the initiation of the next actuation cycle. In such position, the cam lug 308 on the arm 302 of the mechanism 300 is aligned, and thus extends toward and may make contact, with an outer end 96A of the selected one ledge 96 so as to ensure that the pivotal ledge 96 remains in its spring-biased extended position in which an inner end 96B of the ledge 96 underlies the rim R of the cup C so as to retain the empty cup at the intermediate location and stop it from being dropped past any of the ledges 96 at the termination of the current actuation cycle and until the initiation of the next actuation cycle.

FIG. 17 shows the cup retention-and-release mechanism 300 in a cup release position after the lock actuation device 114 of the access door locking mechanism 106, and the auxiliary arm 302 carried therewith, have moved downward in the direction of the arrows and thus converted the access door 104 from the unlocked to locked condition and moved the cam lug 308 on the auxiliary arm 302 below the selected one ledge 96 at the initiation of the next actuation cycle. In such position of the cup retention-and-release mechanism 300 for the duration of operations of the actuation cycle up to the completion thereof, the cam lug 308 on the arm 302 is thereby positioned below and out of contact with the outer end 96A of the selected one ledge 96 so as to enable the pivotal ledge 96, in response to receipt of dispensed product items into the cup whose weight together with the cup's overcomes the bias of the springs 98, to be moved clockwise and retracted outward away from the rim R of the cup C, thereby releasing the loaded cup to then drop downward past all of the pivotal ledges 96 (regardless of the positions of the other ledges 96) to the final discharge location. Once the loaded cup has dropped past the pivotal ledges 96, the bias of the springs 98 returns the ledges 96 back to their extended positions, as represented by nearest one ledge 96 being shown in dashed outline in FIG. 17, in which the inner end 96B of the ledge 96 will underlie the rim R of the next cup C so as to stop the cup upon being dropped at the completion of the current actuation cycle from dropping past any of the ledges 96 at the intermediate position. At the completion of the current actuation cycle, the notch in the wheel 56 (FIG. 15) becomes aligned with the device 114 so as to allow the biasing spring 118 of the access door locking mechanism 106 to be activated so as to unlock the access door 104 and move the auxiliary arm 302 of the cup retention-and-release mechanism 300 upward to the cup hold position until the commencement of a subsequent actuation cycle. The springs 98 have already moved the pivotal ledges 96 to the extended position in which their outer ends 96A do not interfere with or block the cam lug 308 on the upward moving auxiliary arm 302.

It is thought that the present invention and its advantages will be understood from the foregoing description and it will be apparent that various changes may be made thereto without departing from the spirit and scope of the invention or sacrificing all of its material advantages, the forms hereinbefore described being merely exemplary embodiments thereof.

What is claimed is:

1. A sanitized vending machine, comprising:
a product dispensing mechanism adapted to hold a plurality of product items and rotate through a product dispensing cycle during which said product dispensing mechanism dispenses one or more of product items;
a cup dispensing mechanism adapted to hold at least one stack of cups and rotate through a cup dispensing cycle during which said cup dispensing mechanism dispenses a cup from the stack;
a drop chute disposed below and in communication with said product and cup dispensing mechanisms and being adapted to receive the dispensed product items and cup and guide the dispensed product items and cup to an intermediate location in said drop chute, being spaced below said product and cup dispensing mechanisms, and therefrom to a discharge location, being spaced below said drop chute and intermediate location therein;
a cup retention-and-release mechanism disposed about and adjacent to said drop chute at said intermediate location thereof, said mechanism being adapted to convert from a cup hold position, wherein a dispensed cup is caught and retained at said intermediate location awaiting receipt of the dispensed product items into the dispensed cup, to a cup release position in response to receipt of the dispensed product items in the dispensed cup, wherein the dispensed cup with dispensed product items therein releases and drops to said discharge location; and
an actuation mechanism including
a rotatable actuator adapted to cause rotation of said product and cup dispensing mechanisms, and
a handle coupled to said rotatable actuator and adapted to be turned by a user to rotate said rotatable actuator through an actuation cycle that causes rotation of said product and cup dispensing mechanisms through said respective product and cup dispensing cycles in a predetermined sequence so that the dispensed cup is guided to and received at said intermediate location of said drop chute at the completion of one actuation cycle and the dispensed product items are guided to and received in the dispensed cup being located at said intermediate location during the next actuation cycle thereby ensuring that only a cup with product items therein is dropped to said discharge location;
wherein said cup retention-and-release mechanism includes a plurality of pivotal ledges spaced apart from one another and being mounted to said drop chute about said intermediate location in said drop chute to undergo pivotal movement between inward extended positions defining said cup hold position and outward retracted positions defining said cup release position;
wherein said cup retention-and-release mechanism also includes a plurality of springs spaced apart from one another and being disposed so as to bias said pivotal ledges to assume said inward extended position in which said dispensed cup is caught and retained by said pivotal ledges at said intermediate location awaiting dispensing of product items therein, the bias of said springs being preselected such that the weight of the dispensed cup alone is insufficient to overcome the bias of said springs whereas the weight of the dispensed cup with the dispensed product items therein is sufficient to overcome the bias of said springs so as to thereby cause said pivotal ledges to pivot to said outward retracted positions, allowing said dispensed cup and product items therein to drop to said discharge location.

2. The machine of claim 1 wherein said cup retention-and-release mechanism further includes an arm movable between said cup hold position and said cup release position in response to rotation of said rotatable actuator through each actuation cycle, said arm being in said cup hold position at termination of a current actuation cycle and until initiation of a next actuation cycle wherein said arm is aligned with a selected one of said pivotal ledges so as to ensure that said one pivotal ledge remains in said spring-biased extended position retaining the dispensed cup at said intermediate location, said arm being converted to said cup release position during the next actuation cycle wherein said arm is displaced from said selected one pivotal ledge so as to enable said one pivotal ledge and other pivotal ledges to move to said outward retracted position, allowing said dispensed cup and product items therein to drop to said discharge location.

3. The machine of claim 2 further comprising:
an external access door movable between open and closed positions to provide access by a user to the cup containing product items resting at said discharge location behind said access door.

4. The machine of claim 3 further comprising:
an access door locking mechanism coupled to said actuation mechanism and adapted to maintain said access door in a locked condition at a closed position from initiation of an actuation cycle by said handle of said actuation mechanism being turned by a user and until nearing completion of the actuation cycle whereupon said access door is converted to an unlocked condition permitting a user to open said access door and remove the cup containing product items.

5. A sanitized vending machine, comprising:
a housing;
a product dispensing mechanism mounted in said housing, said product dispensing mechanism being adapted to hold a plurality of product items and rotate through a product dispensing cycle during which said product dispensing mechanism dispenses one or more of product items;
a cup dispensing mechanism mounted in said housing, said cup dispensing mechanism being adapted to hold at least one stack of cups and rotate through a cup dispensing cycle during which said cup dispensing mechanism dispenses a cup from the stack;
a drop chute mounted in said housing below and in communication with said product and cup dispensing mechanisms, said drop chute being adapted to receive the dispensed product items and cup and guide the dispensed product items and cup to an intermediate location in said drop chute, being spaced below said product and cup dispensing mechanisms, and therefrom to a discharge location, being spaced below said drop chute and intermediate location therein;
a cup retention-and-release mechanism disposed about and adjacent to said drop chute at said intermediate location thereof, said mechanism being adapted to convert from a cup hold position, wherein a dispensed cup is caught and retained at said intermediate location awaiting receipt of the dispensed product items into the dispensed cup, to a cup release position in response to receipt of the dispensed product items in the dispensed cup, wherein the dispensed cup with dispensed product items therein releases and drops to said discharge location;
an external access door mounted to said housing and being movable between opened and closed positions to provide access by a user to the cup containing product items resting at said discharge location behind said access door;
an actuation mechanism mounted to said housing and including
a rotatable actuator being adapted upon actuation to cause rotation of said product and cup dispensing mechanisms, and
an external handle coupled to said rotatable actuator and adapted to be turned by a user to actuate said rotatable actuator by rotating said rotatable actuator through an actuation cycle that causes rotation of said product and cup dispensing mechanisms through said respective product and cup dispensing cycles in a predetermined sequence so that the dispensed cup is guided to and received at said intermediate location of said drop chute at the completion of one actuation cycle and the dispensed product items are guided to and received in the dispensed cup being located at said intermediate location during the next actuation cycle thereby ensuring that only a cup with product items therein is dropped to said discharge location; and
an access door locking mechanism mounted in said housing and coupled to said actuation mechanism and said cup retention-and-release mechanism such that said access door locking mechanism is adapted to maintain said access door in a locked condition at the closed position from initiation of an actuation cycle by said handle of said actuation mechanism being turned by a user and until nearing completion of the actuation cycle whereupon said access door is converted to an unlocked condition permitting a user to open said access door to the opened position and remove the cup containing product items and said cup retention-and-release mechanism is converted from the cup hold position to the cup release position in which the dispensed cup with dispensed product items therein releases and drops to said discharge location.

6. The machine of claim 5 wherein said cup retention-and-release mechanism includes a plurality of pivotal ledges spaced apart from one another and being mounted to said drop chute about said intermediate location in said drop chute to undergo pivotal movement between inward extended positions defining said cup hold position and outward retracted positions defining said cup release position.

7. The machine of claim 6 wherein said cup retention-and-release mechanism also includes a plurality of springs spaced apart from one another and being disposed so as to bias said pivotal ledges to assume said inward extended position in which said dispensed cup is caught and retained by said pivotal ledges at said intermediate location awaiting dispensing of product items therein, the bias of said springs being preselected such that the weight of the dispensed cup alone is insufficient to overcome the bias of said springs whereas the weight of the dispensed cup with the dispensed product items therein is sufficient to overcome the bias of said springs so as to thereby cause said pivotal ledges to pivot to said outward retracted positions, allowing said dispensed cup and product items therein to drop to said discharge location.

8. The machine of claim 7 wherein said access door locking mechanism includes an elongated rod reciprocally mounted on a back side of said access door and biased to move, when said access door is in a closed position, from a lower position, wherein said access door is placed in a locked condition, to an upper position, wherein said access door is placed in an unlocked condition.

9. The machine of claim 8 wherein said bias of said elongated rod is provided by a spring on said back side of said access door being coupled to said elongated rod.

10. The machine of claim 8 wherein said access door locking mechanism also includes a lock actuation device mounted in said housing, said lock actuation device being coupled to said rotatable actuator of said actuation mechanism and aligned with said elongated rod such that initiation of the actuation cycle by a user turning said handle causing rotation of said rotatable actuator causes said lock actuation device to overcome the bias of said elongated rod and, when said access door is in the closed position, move said elongated rod from said upper position to said lower position and maintain said access door in the locked condition at the closed position until nearing completion of the actuation cycle whereupon the rotational position of said rotatable actuator yields to the bias of said elongated rod causing said elongated rod to move from said lower position to said upper position and cause movement of said lock actuation device to said upward position at the completion of the actuation cycle until the initiation of the next actuation cycle whereupon said access door is converted to the unlocked condition permitting a user to open said access door to the opened position and remove the cup containing product items.

11. The machine of claim 10 wherein said bias of said elongated rod is provided by a spring on said back side of said access door being coupled to said elongated rod.

12. The machine of claim 10 wherein said cup retention-and-release mechanism further includes an arm coupled to said lock actuation device of said access door locking mechanism and movable between said cup hold position and said cup release position in response to movement of said lock actuation device between said upward and downward positions with rotation of said rotatable actuator through each actuation cycle, said arm being in said cup hold position at termination of an actuation cycle and until initiation of a next actuation cycle wherein said arm is aligned with a selected one of said pivotal ledges so as to ensure that said one pivotal ledge remains in said spring-biased extended position retaining the dispensed cup at said intermediate location, said arm being converted to said cup release position during the next actuation cycle wherein said arm is displaced from said selected one pivotal ledge so as to enable said one pivotal ledge and other pivotal ledges to move to said outward retracted position, allowing said dispensed cup and product items therein to drop to said discharge location.

* * * * *